United States Patent
Marin-Martinod et al.

(10) Patent No.: US 7,286,910 B2
(45) Date of Patent: Oct. 23, 2007

(54) INSTALLATION FOR CONTROLLING POWER IN AN AIRCRAFT

(75) Inventors: Thierry Marin-Martinod, Nesles-la-Vallee (FR); Jean-Claude Robert, Le Raincy (FR)

(73) Assignee: Precilec, Auxerre (FR)

( * ) Notice: Subject to any disclaimer, the term of this patent is extended or adjusted under 35 U.S.C. 154(b) by 158 days.

(21) Appl. No.: 11/045,348

(22) Filed: Jan. 31, 2005

(65) Prior Publication Data

US 2006/0085100 A1    Apr. 20, 2006

(51) Int. Cl.
G06F 17/00 (2006.01)
H02J 3/00 (2006.01)

(52) U.S. Cl. ............... 701/3; 701/1; 700/295; 307/11; 307/43

(58) Field of Classification Search ............ 701/1, 701/3, 22; 700/295, 297; 713/320; 307/10.8, 307/11, 29–32, 43, 52
See application file for complete search history.

(56) References Cited

U.S. PATENT DOCUMENTS

| | | | |
|---|---|---|---|
| 5,894,579 A | * | 4/1999 | Fujihara ............ 713/324 |
| 6,046,513 A | * | 4/2000 | Jouper et al. ............ 307/31 |
| 7,089,099 B2 | * | 8/2006 | Shostak et al. ............ 701/32 |
| 7,103,460 B1 | * | 9/2006 | Breed ............ 701/29 |
| 2002/0175567 A1 | | 11/2002 | Marin-Martinod |
| 2004/0021371 A1 | * | 2/2004 | Jouper ............ 307/29 |
| 2005/0125703 A1 | * | 6/2005 | Lefurgy et al. ............ 713/320 |

FOREIGN PATENT DOCUMENTS

| | | |
|---|---|---|
| FR | 2823027 | 10/2002 |
| WO | WO98/19223 | 4/2000 |
| WO | WO02/087053 | 10/2002 |

\* cited by examiner

Primary Examiner—Yonel Beaulieu
(74) Attorney, Agent, or Firm—Young & Thompson (57) ABSTRACT

The installation (10) for controlling power in an aircraft comprises a power distribution network (22); at least two subscribers (14A, 14B, 14C) connected to the network (22); a central power control unit (20) which is capable of allocating a total available power level to each subscriber; and a device for determining the total power effectively consumed for each load of the subscribers. The central power control unit (20) acquires information which represents the total power effectively consumed by each subscriber and is capable of allocating the total available power to each subscriber in accordance with the total power levels effectively consumed by the subscribers.

9 Claims, 6 Drawing Sheets

INSTALLATION FOR CONTROLLING POWER IN AN AIRCRAFT

TECHNICAL FIELD

The present invention relates to an installation for controlling power in an aircraft, of the type comprising:
- a power distribution network;
- at least two subscribers connected to the network, each subscriber comprising a group of loads which consume electrical power and local means for controlling the loads;
- a central power control unit which is capable of allocating a total available power level to each subscriber;
- means for determining the total power effectively consumed for each load; and
- for each subscriber, means for allocating power between the various loads of the subscriber in accordance with the total available power allocated to the subscriber.

BACKGROUND TO THE INVENTION

In passenger transport aircraft, it is necessary to provide each passenger with a given number of items of equipment which are electrically supplied, these items of equipment ensuring maximum comfort for the passenger.

In particular, each passenger generally has an individual light, referred to as a reading light, a power point for a laptop computer, video equipment for viewing films, items of comfort equipment, such as massage devices, and an assembly of electrical actuators which allow the movable elements of the passenger seat to be displaced.

The rapid increase in the number of electrically supplied devices provided for each passenger considerably increases the electrical power consumed in the cabin of the aircraft.

It is thus necessary to control the power consumed by the passengers in the course of the flight.

To this end, it is known, in particular from documents U.S. Pat. No. 5,754,445 and U.S. Pat. No. 6,046,513 to monitor the power consumed by each passenger, to compare the total power currently consumed by all the passengers with a predetermined threshold value and to prevent the use of additional power by any passenger on the aircraft if the total power currently being consumed is greater than the predetermined threshold value corresponding to the total maximum power which can be allocated to the passengers.

The installation described in the above document thus effectively allows the total power consumed by all the passengers to be limited.

However, in so far as after the total maximum power which can be allocated to all the passengers is reached, no passenger can obtain additional power. Only the passengers who switch on their items of electrical equipment first can thus have power. In contrast, the passengers who would like to switch on an additional item of electrical equipment when a very large number of passengers are already consuming a significant amount of electrical power can no longer obtain power.

This can thus lead to frustration for some passengers who cannot switch on some items of equipment provided for them when the passenger next to them is operating similar items of equipment. A control system of this type can be the cause of disputes between passengers.

Furthermore, patent application FR-01 04385 in the name of LABINAL describes a power control installation in which a total available power level is allocated to each subscriber. A local power control unit for each individual subscriber distributes the power between the various loads of the subscriber in accordance with predetermined regulations so that the total power consumed is not greater than the total available power allocated to the subscriber. An installation of this type allows each subscriber to use most of the loads at his disposal, on condition that he agrees not to use these loads simultaneously.

However, this installation does not allow an optimum control of the power of the aircraft.

SUMMARY OF THE INVENTION

The object of the invention is to provide a power control installation which allows the use of the power available in an aircraft to be optimised in order to make the power available to the various passengers.

To this end, the subject-matter of the invention is a power control installation of the above-mentioned type, characterised in that the central power control unit comprises means for acquiring information which represents the total power effectively consumed by each subscriber, and in that the central power control unit is capable of allocating the total available power to each subscriber in accordance with the total power levels effectively consumed by the subscribers.

According to specific embodiments, the power control installation comprises one or more of the following features:
- the representative information is the total power effectively consumed by the subscriber;
- the representative information is all of the elementary power levels effectively consumed by each load of the subscriber;
- the information which represents the total power effectively consumed is determined based on an instantaneous power level effectively consumed by each load;
- the information which represents the total power effectively consumed is determined based on predetermined nominal power levels for the loads which are effectively operational;
- each subscriber comprises a local power control unit in which means are integrated for allocating power between the various subscribers, and each local power control unit is connected to the central power control unit by means of a bidirectional information transmission connection for transferring the predetermined information to the central power control unit and the total available power allocated to each subscriber to each subscriber;
- each local power control unit comprises means for transmitting to the central power control unit a request for modifying the total available power allocated to the subscriber;
- the central power control unit comprises means for reducing the total available power for one or each subscriber that meets a predetermined criterion depending on the total power effectively consumed by the subscriber; and
- the central power control unit is capable of allocating the total available power to each subscriber in such a manner that the sum of the total available power levels allocated is less than a threshold value.

BRIEF DESCRIPTION OF DRAWINGS

The invention will be better understood from a reading of the following description, given purely by way of example and with reference to the drawings, in which.

DESCRIPTION OF PREFERRED EMBODIMENTS

Figure 1:
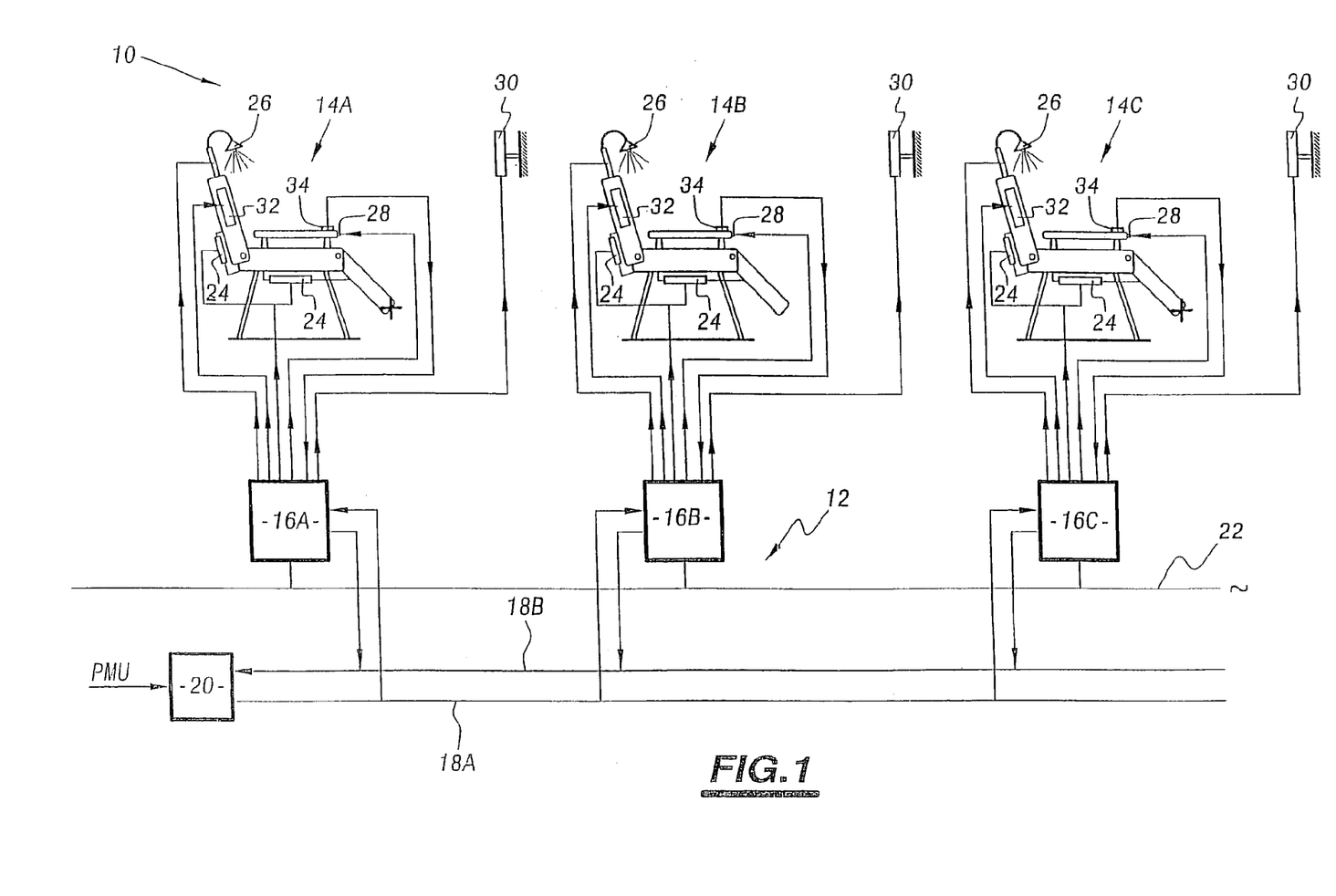
FIG. 1 is a schematic view of a power control installation according to the invention.

FIG. 1 illustrates an electrical power distribution installation 10 which includes a power control installation 12. This power distribution installation is intended to be installed in a vehicle, in particular a passenger transport aircraft.

The installation comprises a group of subscribers 14A, 14B, 14C. Each subscriber corresponds to all of the electrical devices or loads provided for a passenger.

For example, an installation according to the invention controls the power for seventy subscribers in first class when the aircraft is capable of transporting three hundred passengers.

In the installation according to the invention, each subscriber comprises a local power control unit. Only three local units designated 16A, 16B, 16C are illustrated for reasons of clarity. These units are all identical. Each local power control unit is connected, by means of a bidirectional information transmission network 18, to a central power control unit 20.

To this end, the information transmission network 18 is constituted, for example, by a data transfer bus to which the central unit 20 and the local units 16A, 16B and 16C are connected. For reasons of clarity, in the Figures, the bus is indicated by two connections, one downwards which is designated 18A and transmits information from the central power control unit 20 to each of the local units 16A, 16B, 16C, and the other upwards which is designated 18B and transmits information from each local unit 16A, 16B, 16C to the central unit 20.

Furthermore, each local power control unit 16A, 16B, 16C is connected to a common electrical power distribution network 22.

Each subscriber comprises a group of loads which consume electrical power. Each load is connected to the local power control unit 16A, 16B, 16C of the subscriber.

More precisely, in the example in question, a motorised seat is provided for each passenger. Each subscriber thus comprises a plurality of electrical actuators 24 which allow the automatic displacement of the movable parts of the seat in order, for example, to displace the seat from a seated position to a reclined position.

Furthermore, each subscriber comprises a reading light 26, a power point 28 for a laptop computer, video playback equipment 30, and an assembly of comfort devices 32, such as massage devices.

Each consumer load made available to the passenger can be individually controlled by the passenger from a keyboard 34. This keyboard is connected to the associated local power control unit 16A, 16B, 16C.

Figure 2:
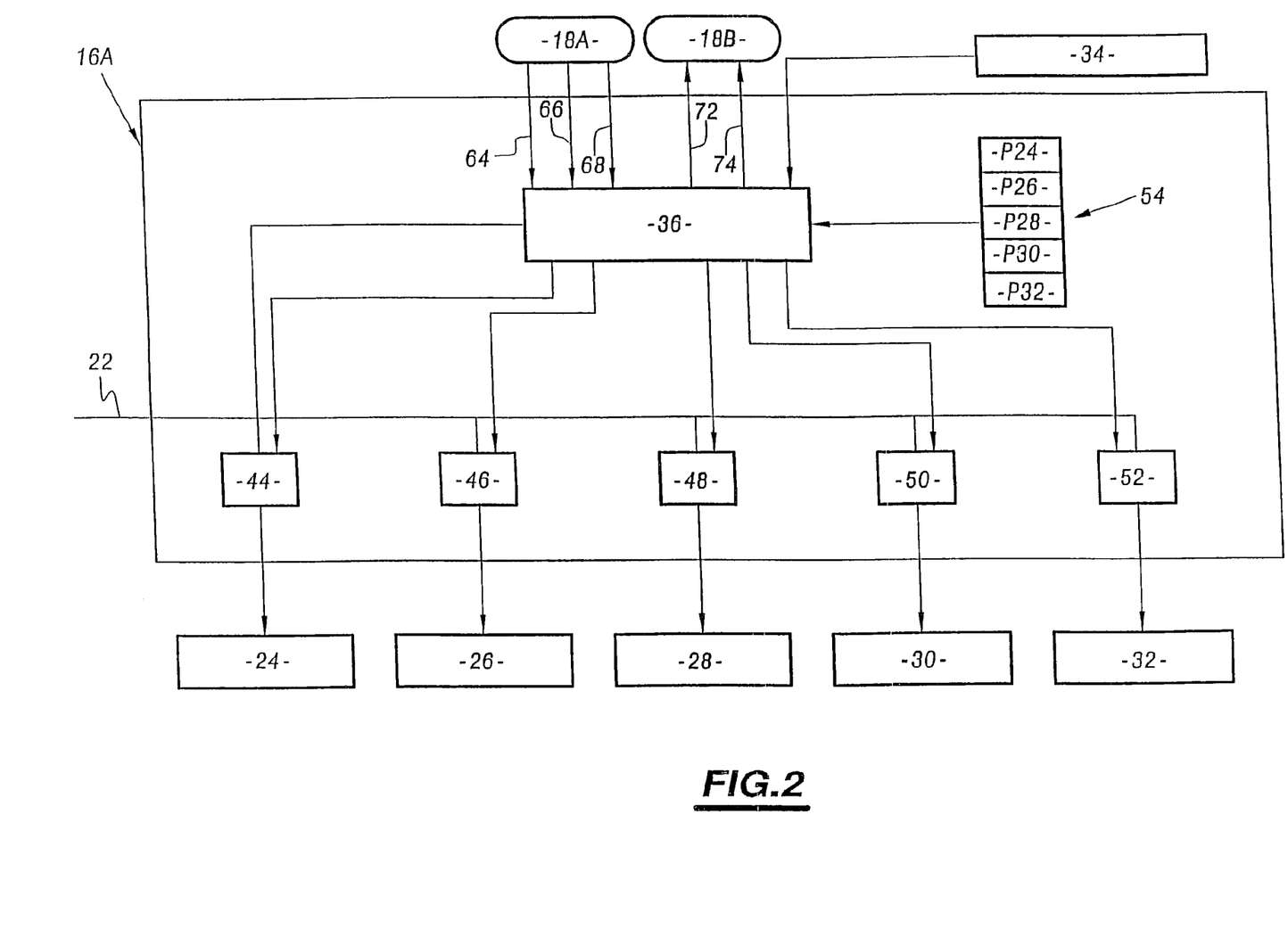
FIG. 2 is a schematic view of a first embodiment of a local power control unit for an individual subscriber.

FIG. 2 illustrates in greater detail the structure of a local power control unit 16A. This unit is illustrated with its connection to the power distribution network 22, to the connections 18A, 18B of the information transmission network 18, to the keyboard 34 and to the loads 24 to 32.

Each local power control unit comprises a control unit 36 which is constituted by an information processing unit which is capable of using a predetermined algorithm. The control unit 36 is formed, for example, by a micro-controller which is associated with a suitable environment.

The control unit 36 is connected to the network 18 by means of a bi-directional communication interface (not shown).

Each of the loads 24 to 32 is connected to the power distribution network 22 via a supply current shaping step, these steps being designated 44, 46, 48, 50, 52 for the loads 24, 26, 28, 30 and 32, respectively.

Each current shaping step 44 to 52 is connected, for the control thereof, to the control unit 36.

Under the control of the control unit 36, each current shaping step ensures that the load connected at the output is supplied with power or that the supply to the load is stopped, or that the current is shaped in a particular manner in order to reduce the power consumed by this load.

In particular, with the actuators 24, the supply current shaping step 44 is capable of producing a current which modifies the speed of the actuators in order to vary the power consumed.

This variation of speed is, for example, produced using a control of the PWM type (pulse width modulation).

In practice, the supply current shaping steps comprise a single current converter, this converter being common to each of the shaping steps. This converter includes, for example, a transformer. At the output of the common converter, each shaping step comprises individual current regulation and commutation means.

In the embodiment illustrated in FIG. 2, the local power control unit comprises storage means 54 which are connected to the control unit 36. These storage means 54 contain, for each load connected to the local power control unit, a characteristic value designated P24 to P32 for the loads 24 to 32. This characteristic value is equal to the nominal power consumed by the associated load during the operation thereof.

Furthermore, the control unit 36 is capable of receiving, on the downward connection 18A of the information transmission network 18, a group of operational parameters which allow the load control input by the user from the keyboard 34 to be modified.

Although the information transmission network 18 can be of any appropriate type, for reasons of clarity in FIG. 2, each operational parameter is supposed to be communicated to the control unit 36 at a specific input.

In particular, at a first input 64, the control unit 36 receives a value $Pd_i$ which represents a total available power level for the subscriber i in question.

At an input 66, the control unit 36 is capable of receiving altitude information A. This binary information indicates whether the altitude is greater than 10 000 feet or less than 10 000 feet.

The input 68 is capable of receiving information T which represents the presence of turbulence in the zone through which the aircraft is travelling.

In the same manner, the control unit 36 is capable of transmitting to the central power control unit 20, on the upward connection 18B of the information transmission network, a group of operational variables which allow the central power control unit 20 to distribute the available power between the various subscribers, and in particular to define a total available power level $Pd_i$ allocated to each subscriber.

As before, although the information transmission network 18 can be of any appropriate type, each operational variable is supposed to be communicated from the control unit at a specific output.

A first output 72 is capable of transmitting, to the central power control unit, a request to increase the total available power $Pd_i$ allocated to the subscriber. A second output 74 allows information which represents the total power designated $Pc_i$ effectively consumed by the subscriber i to be transmitted to the central control unit. This representative information can be of different forms and examples will be given in the remainder of the description.

The central power control unit 20 is capable of calculating and of transmitting, to each local power control unit 16A, 16B, 16C, the operational parameters, that is to say, the total available power $Pd_i$ allocated to the corresponding subscriber i and the information A, T representing the altitude of the aircraft and the presence of turbulence in the region through which the aircraft is travelling. The calculation of the total available power $Pd_i$ allocated to a subscriber i will be described with reference to FIG. 6.

The central power control unit 20 comprises an input for receiving a value PMU of maximum usable power which cannot be exceeded for all the subscribers. This maximum usable power PMU is provided by another computer of the aircraft in accordance with the power which is effectively available in the aircraft.

The power control installation 12 is capable of allowing each subscriber to use only a total maximum power $Pmax_i$ which is allocated to the subscriber in accordance with the operational parameters. To this end, the local power control unit 36 of each subscriber is capable, in accordance with the requests made by the user from the keyboard 34, of controlling each of the loads provided for the user in an appropriate manner so that the total power consumed by the subscriber is always less than the total maximum power $Pmax_i$ allocated to the subscriber. The total maximum power $Pmax_i$ is determined by each local power control unit based on the total available power $Pd_i$ allocated to the subscriber i and the flight conditions indicated by information A and T.

Figure 3:
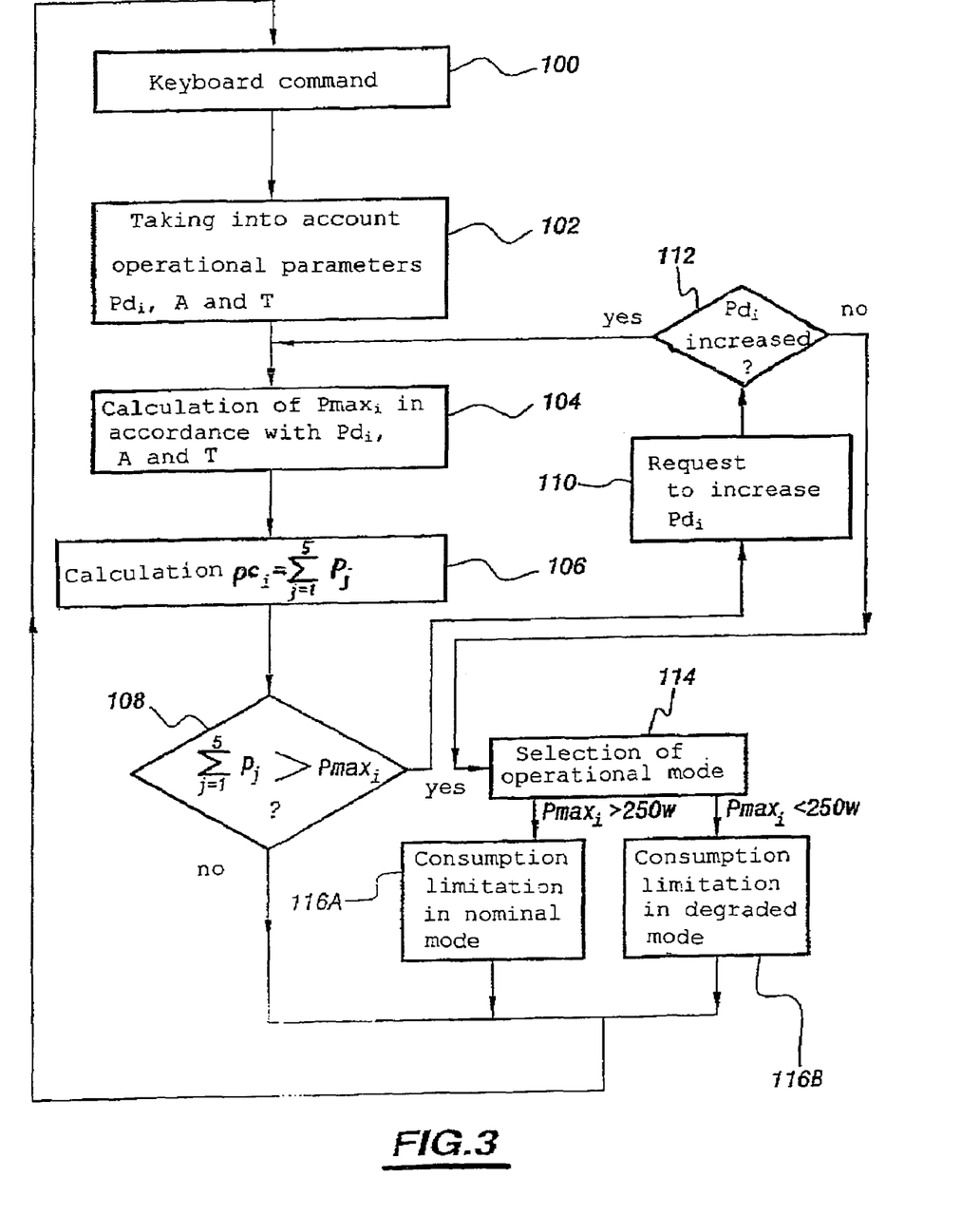
FIG. 3 is a flow chart of the algorithm used in each local power control unit illustrated in FIG. 2.

To this end, the control unit 36 of each subscriber uses the algorithm illustrated in FIG. 3.

In step 100, the control unit 36 scans the keyboard 34 with a view to determining the requests of the user.

In step 102, the operational parameters $Pd_i$, A and T transmitted by the central power control unit 20 are taken into account.

Based on these operational parameters, the calculation of the total maximum allocated power $Pmax_i$ is carried out in step 104. This total maximum power allocated to the subscriber takes into account all the operational parameters received at the inputs 64 to 68. In particular, the total available power $Pd_i$ is taken into account, as well as the altitude A of the aircraft and the presence of turbulence T in the zone through which the aircraft is travelling.

In step 106, the control unit 36 calculates an estimate $Pc_i$ of the total power effectively consumed at the given time. To this end, the control unit determines the sum of the nominal power levels $P_j$ stored in the means 54 for the loads 24 to 32 which are effectively operational.

In step 108, the estimate of the total power $Pc_i$ effectively consumed is compared with the total maximum allocated power $Pmax_i$.

If this estimate of the total power $Pc_i$ effectively consumed is less than the total maximum allocated power $Pmax_i$, the algorithm is used once more.

However, if the estimate of the total power $Pc_i$ effectively consumed is greater than the total maximum allocated power $Pmax_i$, a request to increase the total available power $Pd_i$ allocated to the subscriber is transmitted by the control unit 36 to the central power control unit 20 during step 110 by means of the upward connection 18B.

Following this request and as will be shown in detail with reference to the flow chart of FIG. 3, the central power control unit 20 returns, in response, to the subscriber making the request, a new level of total available power $Pd_i$ or information which represents a refusal to allocate an increased level of total available power.

The response is analysed in step 112 and, if an increased level of total available power $Pd_i$ is allocated, the steps 104 and those which follow are carried out once more. However, if a refusal to allocate an increased level of total available power $Pd_i$ is returned, a consumption limitation phase is carried out locally by the control unit 36 of the local control unit in question.

In this case, a step 111 for selecting an operational mode is first used. This selection step defines the operational mode of the subscriber in accordance with the total maximum allocated power $Pmax_i$. Each operational mode defines a group of priority regulations which allow the loads which are able to be supplied with power to be determined, and the loads which must be stopped or for which the power consumed must be reduced in accordance with the total maximum allocated power $Pmax_i$ which is, for example, greater than 250 W, to be determined.

In the configuration envisaged, two operational modes are provided, a first operational mode which corresponds to a nominal mode in which the total maximum allocated power $Pmax_i$ is greater than 250 W and a degraded operational mode in which the total maximum allocated power $Pmax_i$ is less than 250 W.

When the selection step 114 is complete, and in accordance with the operational mode selected, a step 116A or 116B for limiting consumption is carried out. This step defines the loads for which the supply must be stopped, as well as the loads for which the power consumed must be reduced in accordance with the appropriate priority regulations for the operational mode selected in step 114.

The following table illustrates, by way of example, for each of the loads, the nominal power stored in the store 54. This same table illustrates various situations which correspond to various levels of total maximum allocated power $Pmax_i$ and to various flight situations.

|  |  | Reading light | PC | Video | Comfort | Actuators | Total |
|---|---|---|---|---|---|---|---|
| Nominal power $Pmax_i$ mode |  | 10 | 75 | 100 | 50 | 100 | 335 |
| 1) 300 W Nominal | a) 10 |  | inhibited | 100 | 50 | 100 | 260 |
|  | b) 10 |  | 75 | 100 | 50 | stopped | 235 |
|  | c) 10 |  | 75 | 100 | inhibited | 100 | 285 |
| 2) 200 W degraded | a) off |  | 75 | 100 | inhibited | stopped | 175 |
|  | b) off |  | inhibited | 100 | inhibited | 100 | 200 |
|  | c) 10 |  | inhibited | 100 | inhibited | 90 | 200 |
| 3) Turbulence or <10 000 feet | 10 |  | inhibited | inhibited | inhibited | 100 | 110 |

In the above table, the terms "off" and "stopped" mean that the operation of the load in question is not requested by the passenger. The term "inhibited" means that the local power control unit prevents the supply of the load in question regardless of the passenger command for this load.

In the above example, the sum of the nominal power levels of the loads is 335 Watts.

In the control algorithm used, the priority items of equipment are the reading light 26 and the actuators 24. The operation thereof is thus favoured over other items of equipment when the total maximum allocated power $Pmax_i$ is not sufficient to meet all requirements.

A priority is established between the PC (power point 28 for a computer), the Video and the Comfort, for example: first the Video, then the PC, and finally the Comfort. (After the priorities of reading light and actuators).

For example 1), the total maximum allocated power $Pmax_i$ (300 Watts: nominal mode) is less than the sum of the nominal power levels of the loads. In this case, only two out of three items of equipment, from the PC, the Video and the Comfort, are authorised.

In case a) of example 1), if the Video and the Comfort are switched on and the actuators are moving, the user will not be able to supply the PC with power.

In case b) of example 1), if the actuators are not moving, the PC, the Video and the Comfort can operate.

If the user operates the actuators, from case b) towards case c), the Comfort will be stopped, the Comfort being defined as the lowest-priority item of equipment in the nominal mode.

For example 2), the total maximum allocated power $Pmax_i$ is equal to 200 Watts. The degraded mode is therefore selected in step 114. In this mode, only two out of three items of equipment (PC, Video, Comfort) can be supplied with power when the actuators are not moving (case a) and only one item of equipment can be supplied with power when the actuators are moving (case b).

In degraded mode, the power of the actuators can be limited as desired in accordance with the items of equipment that are switched on.

When the actuators are moving and the reading light is switched on (case c), the power of the actuators is reduced. This is achieved, for example, by the actuators being slowed down when they operate simultaneously so that they do not exceed 90 Watts, or by making the actuators operate one after the other.

In example 3), the three items of equipment, PC, Video and Comfort are inhibited in the case of turbulence or an altitude of less than 10 000 feet.

Figure 4:
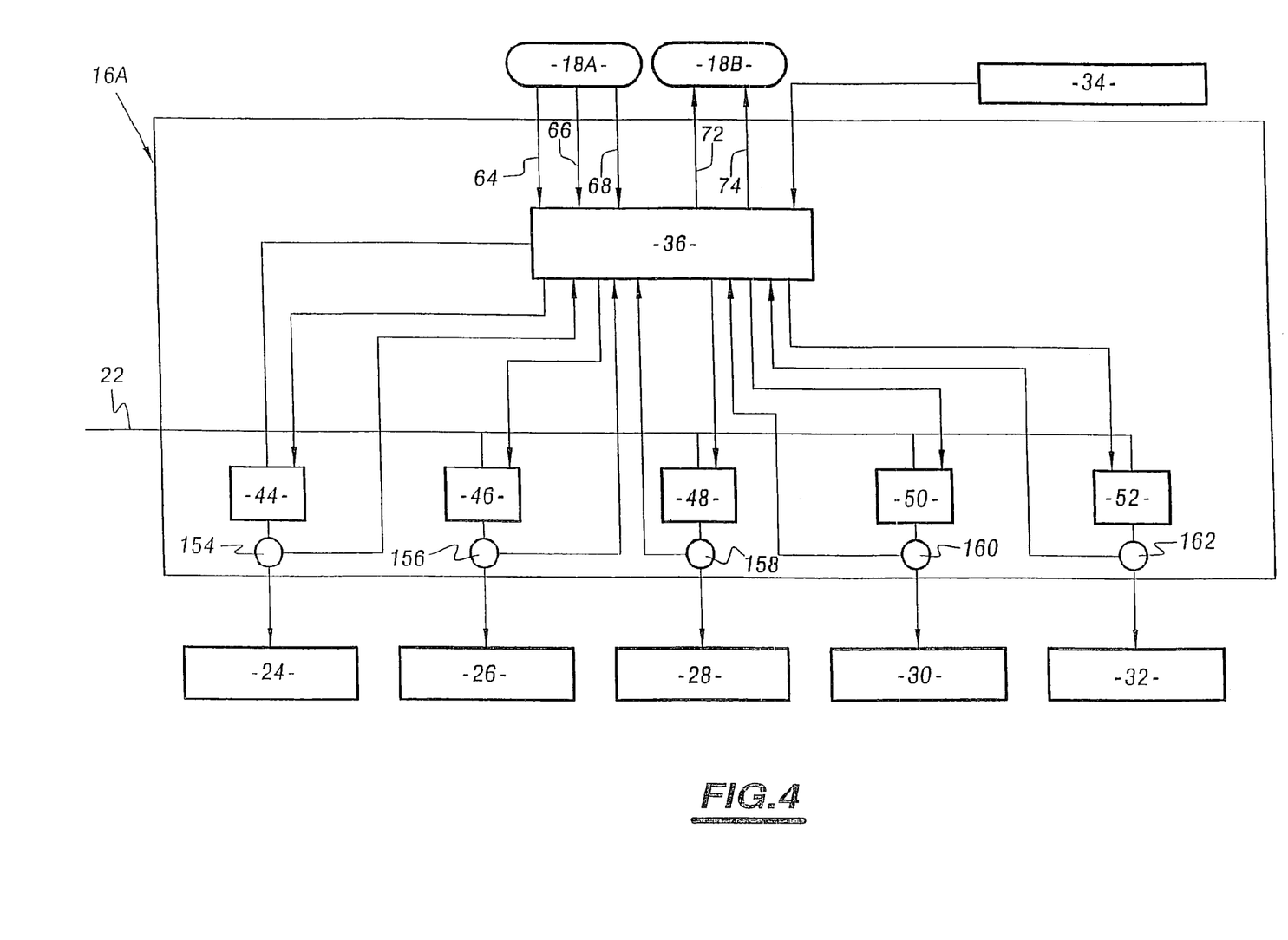
FIG. 4 is a schematic view of a second embodiment of a local power control unit for an individual subscriber.

FIG. 4 illustrates a production variant of a local power control unit 16A according to the invention. This unit repeats the general structure of the unit described with reference to FIG. 2. Elements which are identical or similar are thus designated by the same reference numerals.

However, in this production variant, the store 54 is not provided.

However, each local power control unit comprises a current sensor 154, 156, 158, 160, 162 which is arranged between the current shaping unit and the associated load. These current sensors are each connected to the control unit 36 and are capable of transmitting to the control unit information which represents the intensity of the load supply. This information represents the instantaneous power designated $p_j$ which is effectively consumed by the associated load j, this load being equal to the product of the supply voltage multiplied by the measured intensity.

Figure 5:
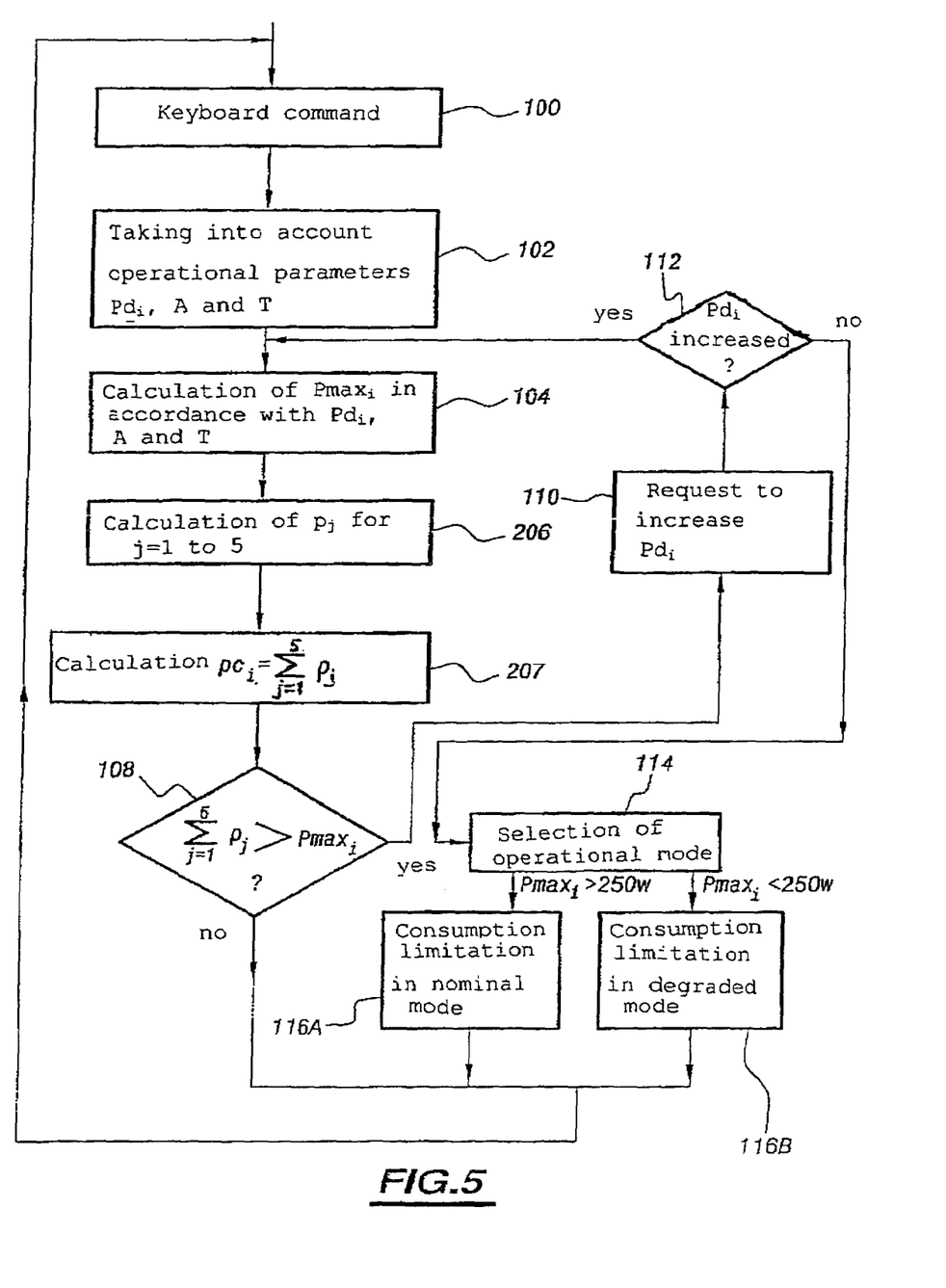
FIG. 5 is a flow chart of the algorithm used in each local power control unit illustrated in FIG. 4.

Furthermore, the control unit 36 uses an algorithm which is illustrated in FIG. 5 and which is slightly different from the algorithm illustrated in FIG. 3.

In particular, this algorithm is capable of determining, based on the intensities effectively supplied to each load, the instantaneous power $p_j$ actually consumed at any time by the load in question.

As illustrated in FIG. 5, the algorithm used thus repeats the first three steps 100 to 104.

However, step 106 is replaced by a step 206 for calculating, for each load j, the elementary instantaneous power $p_j$ which is effectively consumed, this power being determined based on the intensity measured by the associated sensor 154 to 162.

This step is followed by a step 207 for totalling the instantaneous elementary power levels calculated in this manner in order to determine the total power $Pc_i$ effectively consumed at the given time by the group of loads which are connected to the local control unit.

The remainder of the algorithm used is identical to the algorithm described with reference to FIG. 3.

Figure 6:
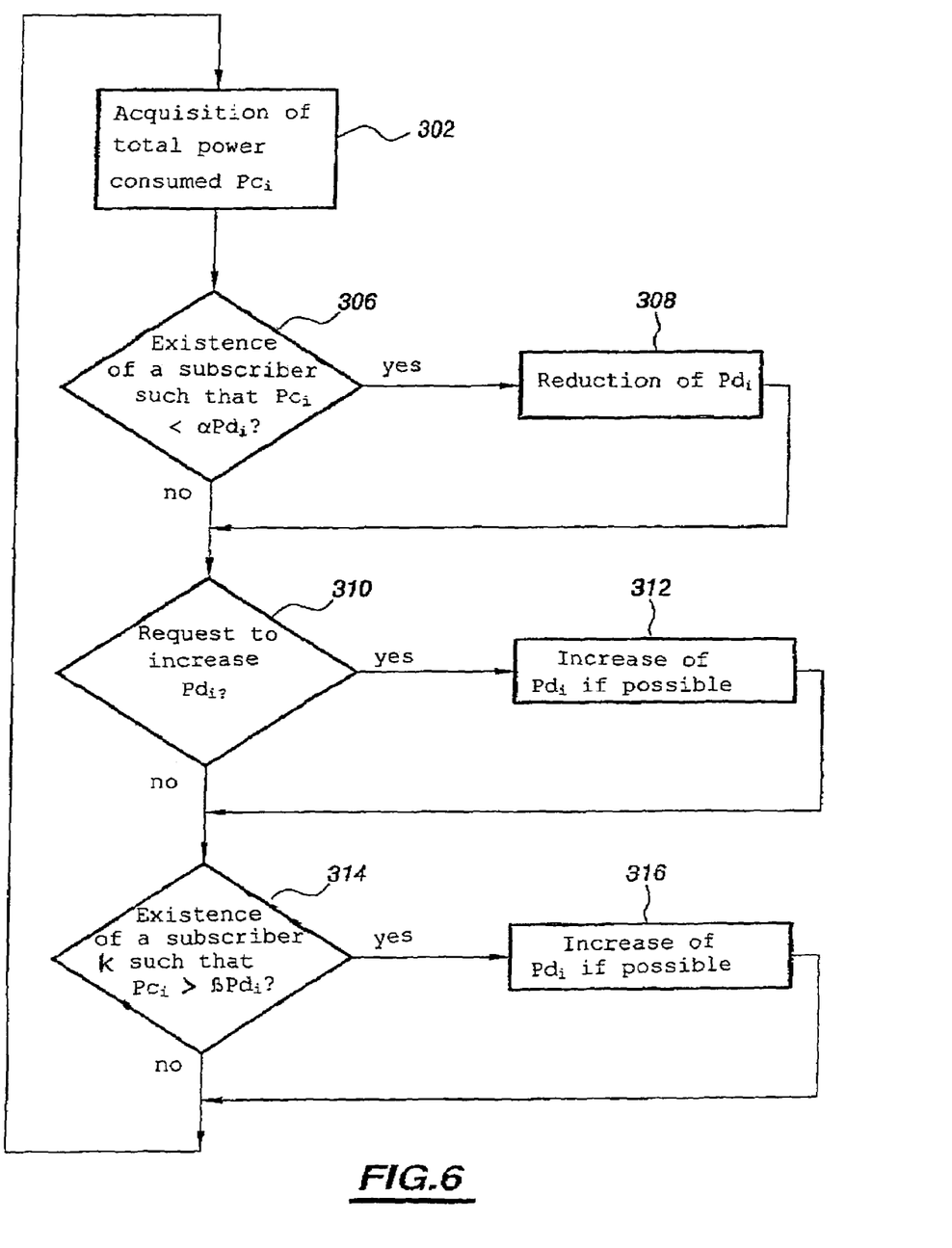
FIG. 6 is a flow chart of the algorithm used in the central power control unit of the installation.

FIG. 6 illustrates the algorithm which is continuously used by the central power control unit during operation of the installation. This cyclical algorithm is used in a loop and is capable of calculating and modifying the values of total available power $Pd_i$ allocated to each subscriber i in accordance with the effective operational conditions of the group of subscribers and the maximum usable power PMU.

In step 302, the central power control unit 20 acquires, for each local power control unit 16A, 16B, 16C, the total power $Pc_i$ effectively consumed by the corresponding subscriber. To this end, the power control units 16A, 16B, 16C periodically transmit, at a frequency of a few Hertz, information which represents the total power $Pc_i$ effectively consumed by the associated subscriber.

In the installation according to the first embodiment illustrated in FIGS. 2 and 3, the total power $Pc_i$ effectively consumed is given by the sum of the nominal power levels $P_j$ stored for the single loads j which are effectively operational.

In the second embodiment illustrated in FIGS. 5 and 6, the total power $Pc_i$ effectively consumed is given by the sum of the levels of instantaneous power $p_j$ actually consumed by the loads j of the subscriber i.

According to other embodiments, the information which represents the total power effectively consumed is constituted, depending on the circumstances, either by all the nominal power levels $P_j$ of the loads which are effectively operational or, in another embodiment, by all the instantaneous power levels $p_j$ which are actually consumed by the loads of the subscriber.

In step 306, it is determined whether there are subscribers for which the total power $Pc_i$ effectively consumed is significantly less than the total available power $Pd_i$ allocated to this subscriber. To this end, the total power $Pc_i$ effectively consumed is compared with $\alpha Pd_i$ where $\alpha$ is between 0 and 1. The value of $\alpha$ is preferably close to 0 and, for example, taken to be equal to 0.2.

If this is the case, the total available power $Pd_i$ allocated to the subscriber i is reduced in step 306. This is, for example, divided by two. Steps 306 and those which follow are then carried out once more.

In step 310, it is analysed as to whether a request to increase the total available power $Pd_i$ is transmitted by a subscriber i. If this is the case, the total available power $Pd_i$ of the subscriber is increased by a predetermined increase value on condition that the sum of the total available power levels $Pd_i$ allocated to all the subscribers is, after this increase, less than the maximum useable power PMU.

When step 312 is complete, steps 306 and those which follow are carried out once more.

In step 314, it is determined as to whether there is a subscriber i whose power effectively consumed is very close to the total available power $Pd_i$. To this end, the total power $Pc_i$ effectively consumed is compared with $\beta Pd_i$ where $\beta$ is between 0 and 1. $\beta$ is greater than $\alpha$ and is close to 1. $\beta$ is, for example, taken to be equal to 0.8.

If this is the case, the total available power $Pd_i$ is increased for the subscriber i to the extent that, after this increase, the sum of the total available power levels $Pd_i$ is less than the maximum usable power PMU.

The steps 306 and those which follow are carried out once more.

When step 314 is complete, steps 302 and those which follow are carried out once more.

It will be appreciated that, with a method of this type, the total available power levels $Pd_i$ allocated to each subscriber are constantly readjusted to take into account the levels of power $Pc_i$ effectively consumed by each subscriber. In this manner, the total available power allocated to the subscribers that consume a small amount of power is reduced whilst the total available power allocated to the subscribers requesting a large amount of power is increased, this transfer of available power from one subscriber to the other ensuring optimum satisfaction for all of the subscribers, whilst ensuring that the sum of the total power levels effectively consumed remains less than the maximum usable power PMU.

It will be appreciated that a power control installation of this type further ensures that each passenger has access to each of the items of equipment at his disposal as long as he does not use them all at the same time.

Furthermore, the total available power allocated to all the passengers is limited whilst at the same time preventing some passengers from being unable to use all their items of equipment if many other passengers are already using their items of equipment.

The invention claimed is:

1. Installation for controlling power in an aircraft, comprising:
   a power distribution network;
   at least two subscribers connected to the network, each subscriber comprising a group of loads which consume electrical power and local means for controlling the loads;
   a central power control unit which allocates a total available power level ($Pd_i$) to each subscriber;
   means for determining the total power effectively consumed for each load; and
   for each subscriber, means for allocating power between the various loads of the subscriber in accordance with the total available power ($Pd_i$) allocated to the subscriber, wherein the central power control unit comprises means for acquiring information which represents the total power ($Pc_i$) effectively consumed by each subscriber;

and in that the central power control unit allocates the total available power ($Pd_i$) to each subscriber in accordance with the total power levels ($Pc_i$) effectively consumed by the subscribers.

2. Installation according to claim 1, wherein the representative information is the total power ($Pc_i$) effectively consumed by the subscriber.

3. Installation according to claim 1, wherein the representative information is all of the elementary power levels ($P_j$; $p_j$) effectively consumed by each load of the subscriber.

4. Installation according to claim 1, wherein the information which represents the total power ($Pc_i$) effectively consumed is determined based on an instantaneous power level ($p_j$) effectively consumed by each load.

5. Installation according to claim 1, wherein the information which represents the total power ($Pc_i$) effectively consumed is determined based on predetermined nominal power levels ($P_j$) for the loads which are effectively operational.

6. Installation according to claim 1, wherein each subscriber comprises a local power control unit in which means are integrated for allocating power between the various subscribers, and in that each local power control unit is connected to the central power control unit by means of a bidirectional information transmission connection for transferring the predetermined information to the central power control unit and the total available power ($Pd_i$) allocated to each subscriber to each subscriber.

7. Installation according to claim 6, wherein each local power control unit comprises means for transmitting to the central power control unit a request for modifying the total available power ($Pd_i$) allocated to the subscriber.

8. Installation according to claim 1, wherein the central power control unit comprises means for reducing the total available power ($Pd_i$) for one or each subscriber that meets a predetermined criterion depending on the total power ($Pc_i$) effectively consumed by the subscriber.

9. Installation according to claim 1, wherein the central power control unit allocates the total available power ($Pd_i$) to each subscriber in such a manner that the sum of the total available power levels allocated is less than a threshold value (PMU).

* * * * *

UNITED STATES PATENT AND TRADEMARK OFFICE
CERTIFICATE OF CORRECTION

PATENT NO. : 7,286,910 B2  Page 1 of 1
APPLICATION NO. : 11/045348
DATED : October 23, 2007
INVENTOR(S) : Marin-Martinod et al.

It is certified that error appears in the above-identified patent and that said Letters Patent is hereby corrected as shown below:

On the title page, insert Item (30) as follows:

-- (30)  Foreign Application Priority Data

JAN. 31, 2004   (FR) ....... 0400917 --.

Signed and Sealed this

Eighteenth Day of March, 2008

JON W. DUDAS
*Director of the United States Patent and Trademark Office*